United States Patent [19]

Yamano et al.

[11] Patent Number: 5,299,184
[45] Date of Patent: Mar. 29, 1994

[54] INFORMATION PROCESSING APPARATUS WITH HELD DISTANCE CONTROL ON TRACK EDGE DETECTION

[75] Inventors: Akihiko Yamano, Sagamihara; Katsunori Hatanaka, Yokohama; Kunihiro Sakai, Isehara; Takahiro Oguchi, Ebina; Shunichi Shido, Yokohama, all of Japan

[73] Assignee: Canon Kabushiki Kaisha, Tokyo, Japan

[21] Appl. No.: 882,930

[22] Filed: May 14, 1992

[30] Foreign Application Priority Data

May 15, 1991 [JP] Japan .................... 3-139631

[51] Int. Cl.$^5$ ................................. G11B 7/00
[52] U.S. Cl. ..................... 369/44.280; 369/44.340; 369/126; 250/306
[58] Field of Search ............. 369/44.28, 44.27, 44.29, 369/44.34, 44.35, 125, 126; 250/306, 307

[56] References Cited

U.S. PATENT DOCUMENTS

| | | | |
|---|---|---|---|
| 4,575,822 | 3/1986 | Quate | 365/174 |
| 5,107,112 | 4/1992 | Yanagisawa et al. | 250/306 |

FOREIGN PATENT DOCUMENTS

| | | | |
|---|---|---|---|
| 61-80536 | 4/1986 | Japan | . |
| 63-142527(A) | 6/1988 | Japan | 369/44.35 |
| 63-161552 | 7/1988 | Japan | . |
| 63-161553 | 7/1988 | Japan | . |
| 1-53363 | 3/1989 | Japan | . |
| 1-133239 | 5/1989 | Japan | . |

OTHER PUBLICATIONS

"Scanning tunneling microscopy" by G. Binnig, H. Rohrer; Helvetica Physica Acta. vol. 55, No. 6/1982 pp. 726–735.

*Primary Examiner*—Aristotelis Psitos
*Assistant Examiner*—Muhammad N. Edun
*Attorney, Agent, or Firm*—Fitzpatrick, Cella, Harper & Scinto

[57] ABSTRACT

There is disclosed an information recording/reproducing apparatus utilizing a probe electrode and a recording medium, based on the principle of scanning tunnel microscope. When a track groove on the recording medium is detected, the distance control between the probe electrode and the recording medium is suspended. Consequently, the tip of the probe electrode does not enter the track groove, and is prevented from collision with the recording medium. The scanning speed of the probe electrode can, therefore, be increased without the danger of such collision.

3 Claims, 7 Drawing Sheets

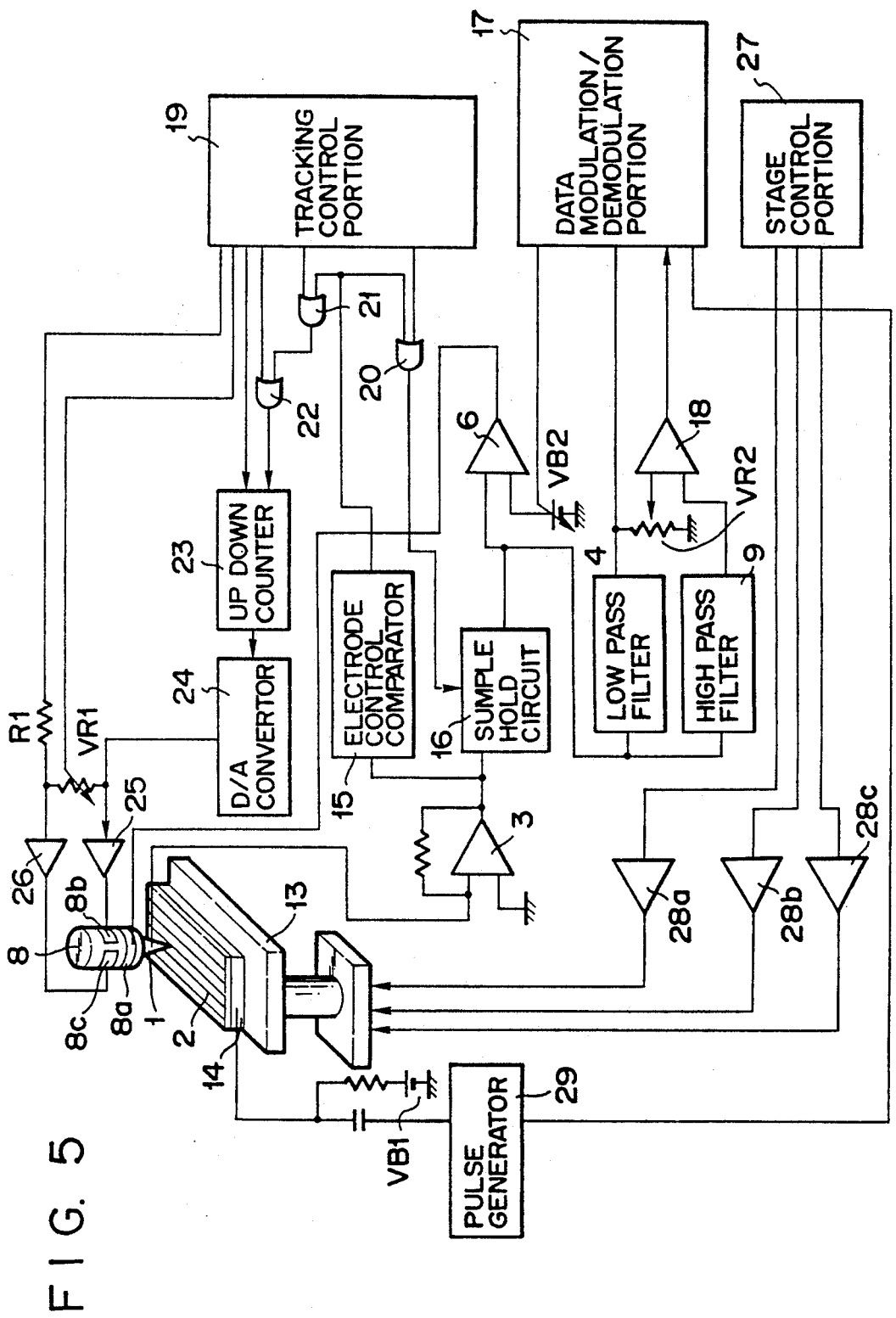
F I G. 5

INFORMATION PROCESSING APPARATUS WITH HELD DISTANCE CONTROL ON TRACK EDGE DETECTION

BACKGROUND OF THE INVENTION

1. Field of the Invention

The present invention relates to an information processing apparatus utilizing the technology of scanning tunnel microscope.

2. Related Background Art

Recently, the use for memory material constitutes the nucleus of electronics industry of electronic equipment such as computer and its peripheral device, video and audio disk equipment, and development of such material is being conducted actively. Conventionally, magnetic and semiconductor memories consisting of magnetic and semiconductive materials, have been utilized principally, but inexpensive optical memories capable of high density recording, consisting of an organic thin film, for example, of organic pigments or photopolymer, are being introduced as a result of progress in the laser technology.

On the other hand, the recent development of scanning tunnel microscope (STM) capable of directly observing the electron structure on or in the vicinity of the material surface [G. Binnig et al., Helvetica Physica Acta, 55, 726 (1982)] has enabled the observation of a real spatial image of monocrystalline or non-crystalline material with a high resolving power. Wider applications are expected for said microscope, as it can effect the measurement with a low electric power and with no damage to the specimen by the current, and as it can be applied to various substances not only under high vacuum but also in atmospheric pressure or in solution.

STM is based on a phenomenon that a tunnelling current is generated when a metal probe is brought to a distance of about 1 nm to a conductive specimen, with a voltage applied therebetween. Since said tunnelling current is extremely sensitive to and exponentially varies with the said distance, the real spatial shape of the specimen surface can be obtained with a resolving power of about 0.1 nm along the surface, by scanning the specimen surface with the probe while maintaining a constant tunnelling current therebetween.

According to application of the above-explained principle of the STM, it is possible to perform the recording and reproduction of information in the atomic (sub-nanometer) order. So, there have been proposed various information processing apparatus for recording, reproduction and/or erasure of information with an ultra high density, based on said principle. For example, Japanese Patent Application Laid-open No. 61-80536 discloses the information recording by elimination of atomic particles adhered on the recording medium with an electron beam. Also, there is proposed information recording method by physical or magnetic breakdown of the surface of the recording medium with a laser beam, an electron beam or a particle beam.

Also, U.S. Pat. No. 4,575,822 discloses information recording by a charge injection with the tunnelling current into a dielectric layer formed on the surface of the recording medium. In these cases, the recording and reproduction of information are conducted by STM. Furthermore, Japanese Patent Application Laid-open Nos. 63-161552 and 63-161553 propose the information recording and reproduction with STM, utilizing a substance with memory effect on the voltage-current switching characteristic, such as organic compounds of a $\pi$-electron system or chalcogenide compounds, as a thin film recording layer. Such method enables a large-capacity recording of $10^{12}$ bit/cm$^2$ in a recording bit size of 10 nm.

In such information processing apparatus, it is essential to effect the scanning operation with a constant average tunnelling current between the probe and the recording medium, and control methods therefor are proposed, for example, in Japanese Patent Application Laid-open Nos. 1-53363 and 1-133239.

FIG. 1 shows a conventional control circuit for the distance between the probe and the recording medium, wherein the tunnelling current flowing between a probe electrode 1 and a recording medium 2 is amplified by an amplifier 3. A band component extracted by a low-pass filter 4 is supplied through a phase compensation circuit 5, an error amplifier 6 and a sample hold circuit 7, and is used for feedback control on the operating voltage of a cylindrical piezoelectric actuator 8 connected to the probe electrode 1, so that the average tunnelling current is maintained constant. On the other hand, a band component extracted by a high-pass filter 9 is supplied to a signal processing circuit 10 thereby reproducing the information. Upon input of recording signal, the sample hold circuit 7 is utilized to maintain a constant output signal for the probe electrode 1.

The above-explained control is also possible in a circuit shown in FIG. 2. The current flowing between a probe electrode 1 and a recording medium 2 is supplied through a current amplifier 3, a logarithmic amplifier 11, a low-pass filter 4, an amplifier 12, a phase compensation circuit 5, an error amplifier 6 and a sample hold circuit 7, and is used for feedback control on the operating voltage of a cylindrical piezoelectric actuator 8. The information is reproduced from the output of a lowpass filter 4 in a signal processing circuit 10. Upon input of a recording signal, the probe electrode 1 is operated in a similar manner as in the circuit shown in FIG. 1.

In such information processing apparatus, the probe electrode 1 has to be positioned upon access to the recording medium 2. In such high-density memory, there is generally employed an access method in which plural edges (tracks) for positioning are formed on the recording medium 2 in advance as shown in FIG. 4, and after detecting a desired edge, the probe electrode 1 is moved to an access position (information column) along the edge. Upon access in direction B, there is frequently conducted movement from a track to another track. Such movement between tracks is executed by giving an offset value to the driving voltage of a scanning mechanism for the probe electrode 1, or by moving a rough moving mechanism itself.

In the conventional information processing apparatus, since the probe electrode 1 is moved along the plane of the recording medium 2 with the average tunnelling current maintained substantially constant as explained above, tip of the probe electrode 1 follows a broken-lined trajectory shown in FIG. 3 when it crosses a recessed track groove T in an access operation.

Since the tip of the probe electrode 1 is generally made very sharp, it has to be prevented from contact with the recording medium 2. For this reason, in the above-explained conventional example, the probe electrode 1 is scanned with speed enabling feedback control, in order to avoid collision of the probe electrode 1 with the recording medium 2 when said probe electrode 1 comes out of the recess on the recording medium 2. The fact that the scanning speed is limited by the ability of feedback control, gives rise to a limitation in application fields requiring a high access speed.

SUMMARY OF THE INVENTION

The object of the present invention is to provide an information processing apparatus capable of resolving the drawbacks of the above-explained conventional technologies and providing a faster speed of data access, thereby enabling application to various fields.

The above-mentioned object can be attained, according to the present invention, by an information processing apparatus comprising probe drive means for feedback control of the probe position by detecting the signal from the recording medium, edge detection means for detecting a predetermined edge on said recording medium, and holding means for holding the control of said probe drive means in response to the output signal from said edge detection means In the information processing apparatus of the above-mentioned structure, the probe position is feedback-controlled in such a manner that the average of the tunnelling current detected, for example, by tunnelling current detecting means, becomes substantially constant, but the probe control is suspended when an edge is detected on the recording medium.

BRIEF DESCRIPTION OF THE DRAWINGS

FIG. 5 is a block diagram of a first embodiment of the information record/reproducing apparatus of the present invention;

DESCRIPTION OF THE PREFERRED EMBODIMENTS

Now the present invention will be explained in detail by embodiments thereof shown in FIGS. 5 to 8.

Figure 1:
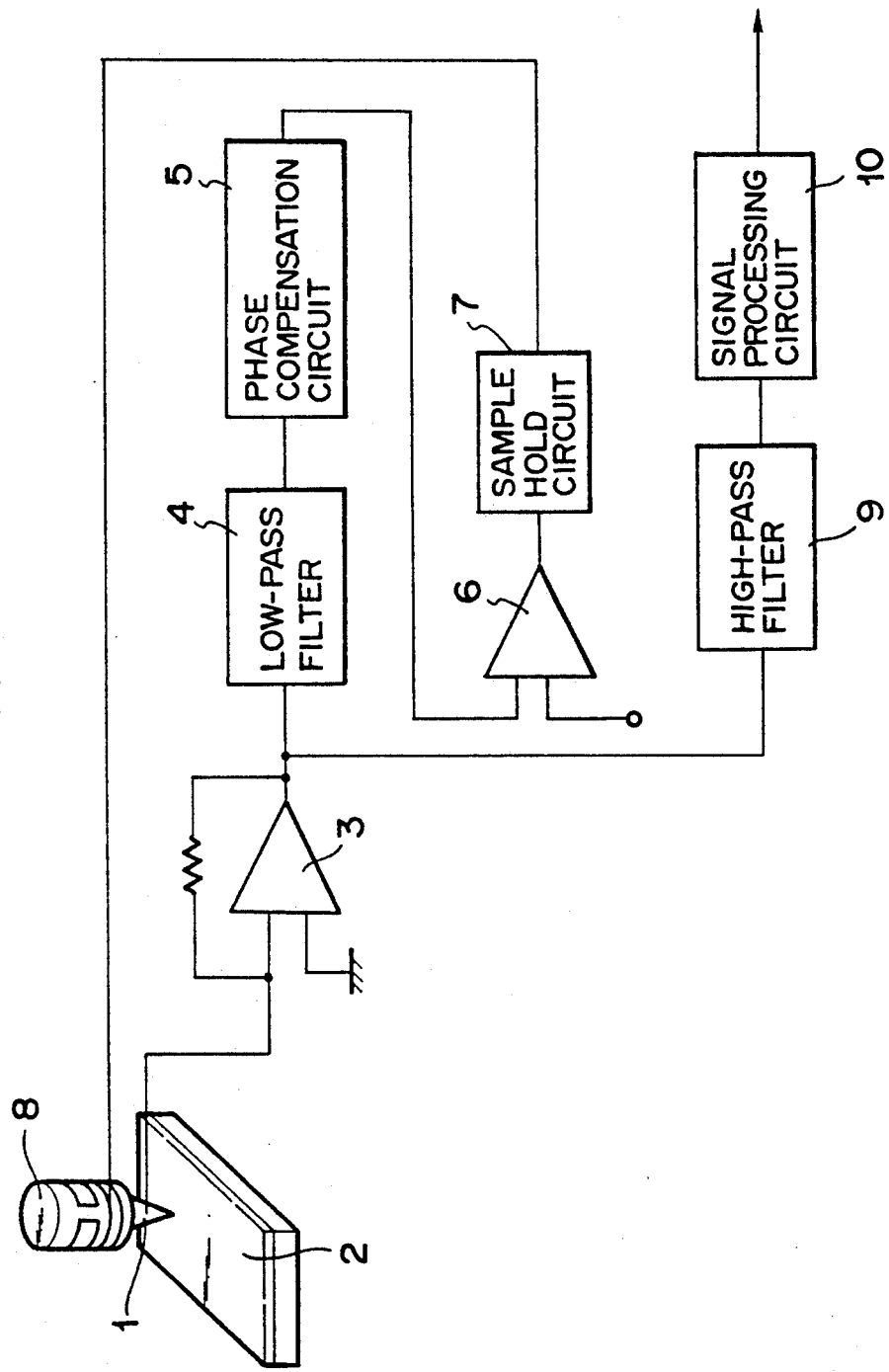
FIG. 1 is a block diagram of a conventional information record/reproducing apparatus.
Figure 2:
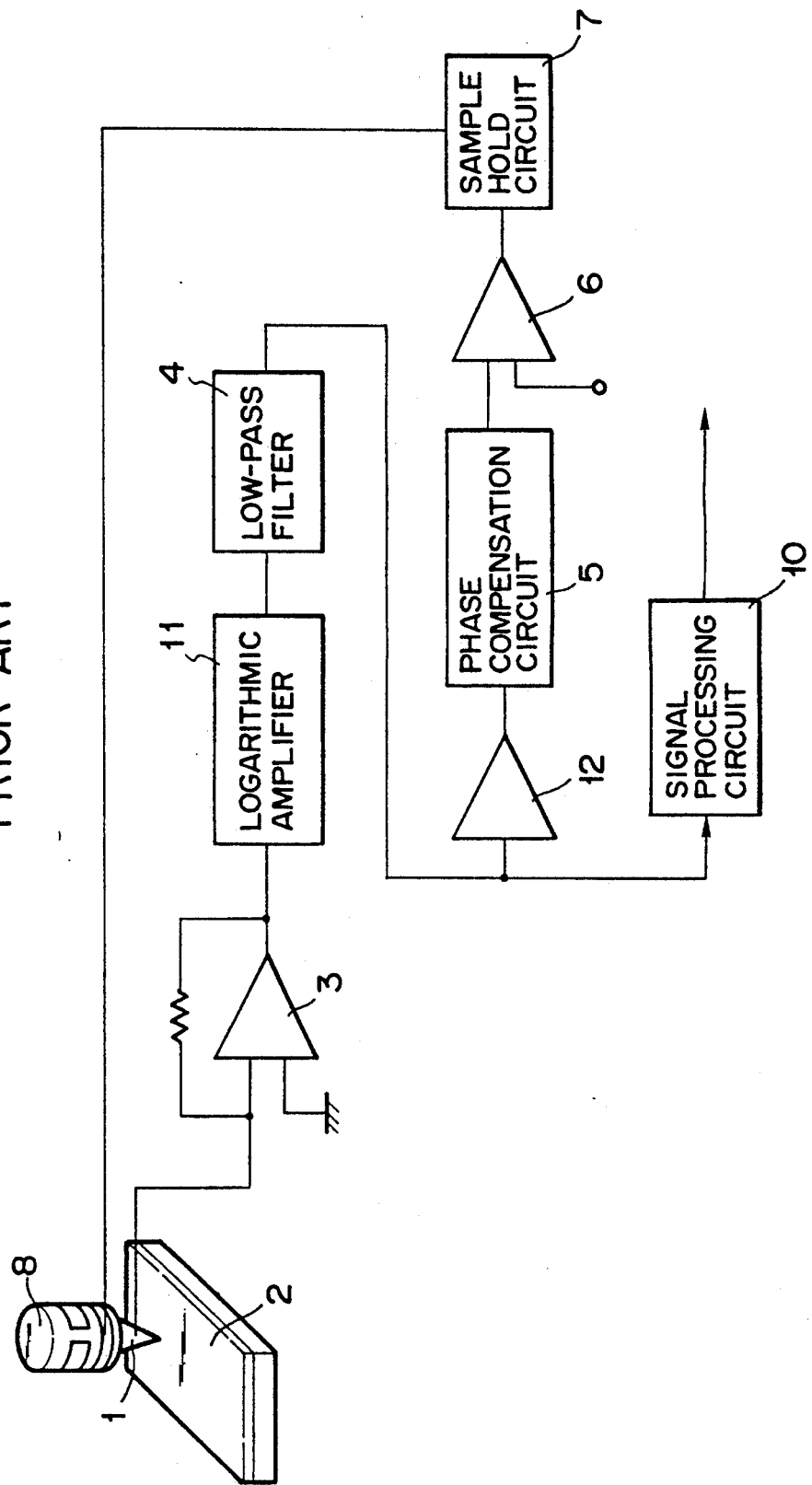
FIG. 2 is a block diagram of another conventional information record/reproducing apparatus.
Figure 3:
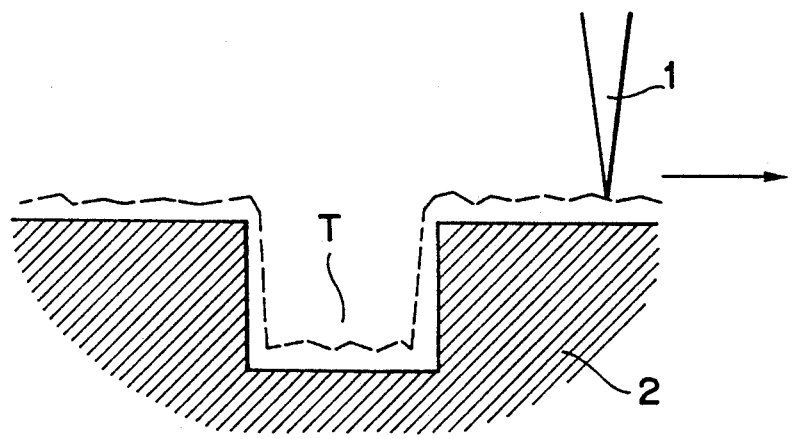
FIG. 3 is a schematic view showing the conventional trajectory of the pointed end of a probe electrode.

FIG. 5 is a block diagram of a preferred embodiment of the present invention, wherein components same as or equivalent to those in FIG. 1 are represented by same numbers. A recording medium 2 with a lower electrode 14 is placed on a stage 13. A probe electrode 1 mounted on a cylindrical piezoelectric actuator 8 is provided downwards to face the recording medium 2. For detecting the tunnelling current, the probe electrode 1 is connected to a current amplifier 3 whose output is supplied to an electrode controlling comparator 15 and a sample hold circuit 16. The output of the sample hold circuit 16 is connected to an error amplifier 6, a low-pass filter 4 and a high pass filter 9. The output of said error amplifier 6 is supplied to a z-direction driving electrode 8a of the cylindrical piezoelectric actuator 8, which the output of the low-pass filter 4 is supplied through a data modulation/ demodulation portion 17 and a variable resistor VR2 to a data detection comparator 18. The output of the high-pass filter 9 is supplied to a data detection comparator 18 whose output is supplied in turn to the data modulation/demodulation portion 17. The output of said electrode controlling comparator 15 is supplied to an OR gate 20 and an AND gate 21 to which outputs from a tracking control unit 19 are also supplied. The OR gate 20 also receives the output from the tracking control portion 19, and sends an output signal to the sample hold circuit 16. The AND gate 21 also receives the output from the tracking control unit 19, and sends an output signal to an OR gate 22 whose output is supplied together with an output signal from the tracking control portion 19 to an up-down counter 23. The output of said up-down counter 23 is supplied through a D/A converter 24 and an amplifier 25 to an x-direction driving electrode 8b of the cylindrical piezoelectric actuator 8. Also, the output of the D/A converter 24 is supplied together with an output from the tracking control unit 19 through a variable resistor VR1 and a resistor R1 to an amplifier 26 which is connected to a y-direction driving electrode 8c of the cylindrical piezoelectric actuator 8. On the other hand, outputs of a stage control portion 27 are supplied to amplifiers 28a, 28b, 28c whose outputs are supplied to the stage 13, thereby enabling three-dimensional movement of the recording medium 2 placed on said stage 13. Output of the data modulation/demodulation portion 17 is supplied to a pulse generator 29 whose output is supplied, after mixing with a DC bias voltage VB1 by means of a resistor R1 and a capacitor C1, to the lower electrode 14. The cylindrical piezoelectric actuator 8 is capable of moving the probe electrode 1 three-dimensionally over a maximum distance of 2 μm.

Figure 4:
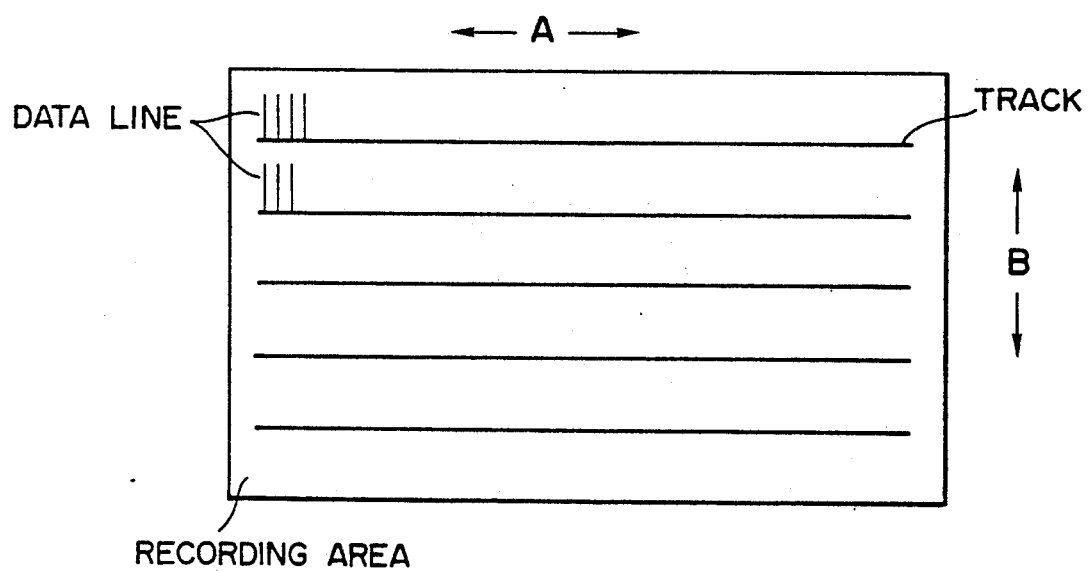
FIG. 4 is a plan view showing the configuration of an information recording medium.

Data are recorded on data lines on the recording medium 2, and as shown in FIG. 4, between the data lines in the direction B, there is provided a track groove which can be utilized for the positioning of the probe electrode 1. Upon data reproduction, the sample hold circuit 16 is maintained in the through state, and the data line is scanned as will be explained later. A tunnelling current flows between the probe electrode 1 and the recording medium 2, depending on the potential difference generated between the probe electrode and the lower electrode by the DC bias voltage source VB1 connected through the resistor R1. Said tunnelling current is detected and amplified by the current amplifier 3, then supplied through the sample hold circuit 16 and compared with a reference voltage VB2 in the error amplifier 6. The resulting error voltage is fed back to the z-direction driving electrode 8a, whereby the probe electrode 1 is so moved as to follow the protruding portions or the change in the electron state of the data line on the recording medium 2.

On the other hand, the output from the sample hold circuit 16 is supplied to the low-pass filter 4 and the high-pass filter 9. An voltage of which an envelope signal obtained by integration in the low-pass filter 4 is suitably attenuated, by the variable resistor VR2, is compared with the output from the high-pass filter 9 in the data detection comparator 18, and is supplied as binarized data to the data modulation/demodulation portion 17. The variable resistor VR2 is selected larger than the output voltage obtained from the data line.

Figure 6:
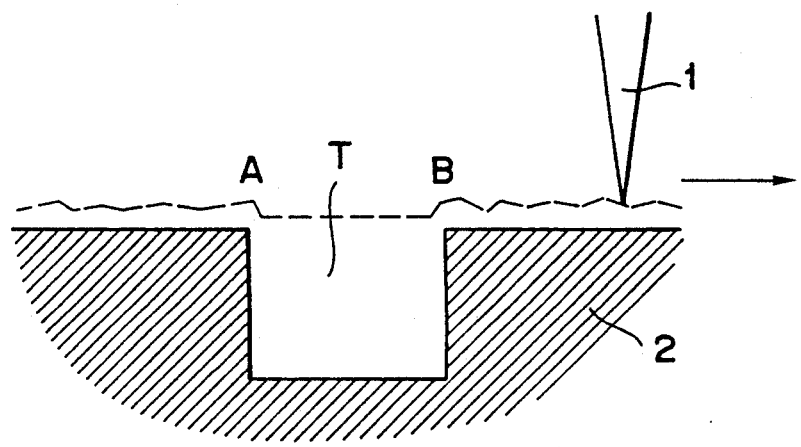
FIG. 6 is a schematic view showing the trajectory of the pointed end of the probe electrode in the apparatus shown in FIG. 5.

Upon access operation, the output of the current amplifier 3 is supplied to an electrode controlling comparator 15. When the probe electrode 1 reaches an edge A of the track groove T as shown in FIG. 6, edge detection is performed in the electrode controlling comparator 15. Said edge detection is executed by comparing the output of the current amplifier 3 with a predetermined threshold value. The output of said comparator 15 is supplied through an OR gate 20 to the sample hold circuit 16, thereby holding the movement of the probe electrode 1 in the z-direction. When the probe electrode 1 reaches the other edge B beyond the track groove T and the tunnelling current starts again to flow, the output of the OR gate 20 is turned off, whereby the feedback control of the probe electrode 1 is started. Consequently, the pointed end of the probe electrode 1 follows a broken-lined trajectory shown in FIG. 6. If plural track grooves T are crossed upon the access operation, the movement of the probe electrode 1 in the z-direction is held when the probe electrode 1 detects the track groove T, and the above-explained operation is repeated until a desired track groove is reached. In the case that the movement of the probe electrode 1 in the z-direction may be held in a state other than the movement between the tracks, an on-signal is inputted to the OR gate 20. The arrival at the desired track can be detected by counting the number of crossed tracks.

In the following explained is the scanning motion of the probe electrode 1 for recording or reproduction after the desired track is reached. The edge detection signal of the desired track, detected by the electrode controlling comparator 15, is supplied through the AND gate 21 and the OR gate 22, as an up input signal, to the up-down counter 23, wherein the AND gate 21 provides the logical multiplication with a track movement signal supplied from the tracking control unit 19, while the OR gate 22 provides the logical sum with an up-control signal supplied from said tracking control unit 19. The updown counter 23 initiates the up-counting operation in response to the edge detection by the electrode controlling comparator 15, but it is switched to the down-counting state by the entry of a down-control signal from the tracking control unit 19 after a predetermined count.

Since the output of the up-down counter 23 is connected through the D/A converter 24 and the amplifier 26 to the x-direction driving electrode 8b, the probe electrode 1 is driven in the x-direction by the cylindrical piezoelectric actuator 8. The output signal of the up-down counter 23 is supplied through the resistor R1 and the variable resistor VR1 controlled by an output direction control signal from the tracking control portion 19, then is mixed with a wobbling signal from the tracking control portion 19 and supplied to the y-direction driving electrode 8c, whereby the probe electrode 1 is also moved in the y-direction by the cylindrical piezoelectric actuator 8. Consequently, after edge detection by the electrode controlling comparator 15, the up-down counter 23 is switched to the up-counting state when the track movement signal is inputted from the tracking control unit 19. The probe electrode effects reciprocating motion in a direction perpendicular to the track, thereby achieving a scanning motion for information recording or reproduction.

The scanning direction of the probe electrode 1 can be controlled by varying the driving ratio in the x- and y-directions by regulation of the variable resistor VR2. The appropriate scanning direction can be obtained by monitoring the envelope signal of the tunnelling current while moving the probe electrode 1 in the y-direction by varying the wobbling voltage. The scanning direction of the probe electrode 1 is not inverted during the movement between the tracks, since the signal supplied from the tracking control portion 19 to the AND gate 21 is turned off during such movement.

Upon data recording, the probe electrode 1 is made to scan the data line of the recording medium 2, and the sample hold circuit 16 is maintained in the holding state in synchronization with data recording clock signals, thereby generating writing pulses from the pulse generator 29 according to data signals released from the data modulation/demodulation unit 17.

Figure 7:
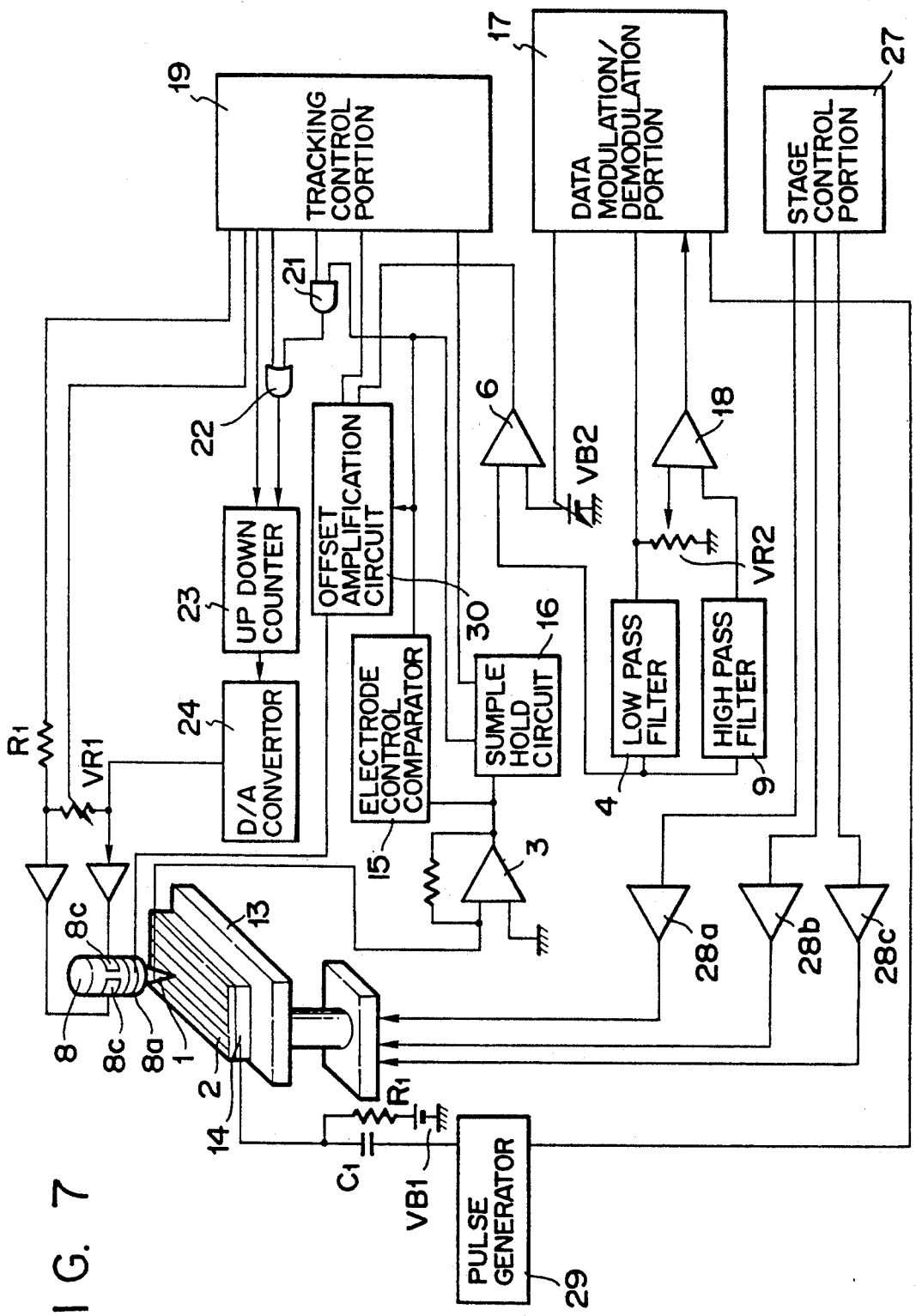
FIG. 7 is a block diagram of a second embodiment of the information record/reproducing apparatus of the present invention.

FIG. 7 shows the configuration of a second embodiment, in which the output of the electrode controlling comparator 15 is supplied to the sample hold circuit 16, the AND gate 21 and an offset amplifier 30. Further, the output of the error amplifier 6 is supplied to the offset amplifier 30 whose output is supplied to the z-direction driving electrode 8a. The tracking control portion 19 is connected to the sample hold circuit 16 and the offset amplifier 30. Other configurations are same as in the first embodiment.

This embodiment is different from the first embodiment in the holding operation of the probe electrode 1 after the detection of the track groove T by the electrode controlling comparator 15. The probe electrode 1 is held in response to the inputting try of the edge detection signal from the comparator 15 to the sample hold circuit 16 and the offset amplifier 30. The probe electrode 1 is separated by a predetermined distance from the recording medium 2 by a certain offset voltage supplied from said offset amplifier 30 to the z-direction driving electrode 8a. After lapse of a predetermined time, the tracking control unit 19 sends a signal to the sample hold circuit 16 and the offset amplifier 30 to terminate the holding state, and then the feedback control of the probe electrode 1 is re-started.

Figure 8:
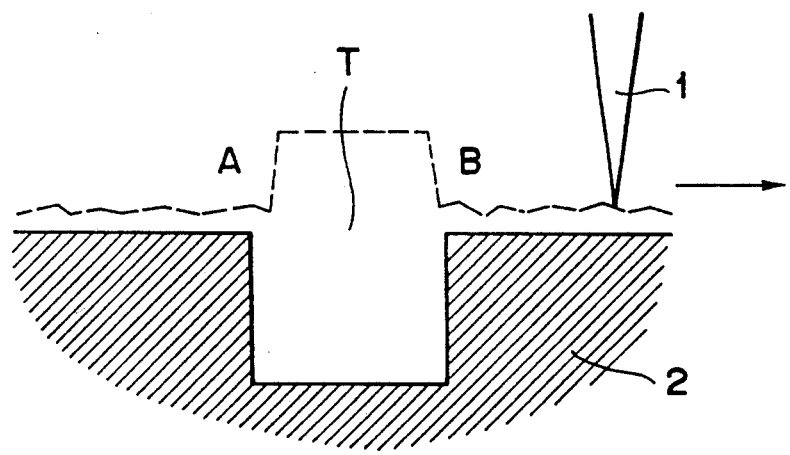
FIG. 8 is a schematic view of the trajectory of the pointed end of the probe electrode in the apparatus shown in FIG. 7.

Consequently, the tip of the probe electrode 1 follows the broken-lined trajectory shown in FIG. 8. In a probe movement over a large distance, the probe electrode 1 may be separated from the recording medium 2 and lowered after the access position is reached. This principle is applicable in other operations in order to prevent the collision between the probe electrode 1 and the recording medium 2.

The recording medium 2 employed has a memory effect for the current-voltage characteristic between the probe electrode 1 and the recording medium 2. Examples of such recording medium, for information recording by formation of surface irregularities, include a HOPG (highly oriental pyrolithic graphite) substrate, a silicon wafer, a thin metal film of Au, Ag, Mo or Cu formed by vacuum evaporation or epitaxial growth, and a glass alloy such as $Rh_{25}Zr_{75}$ or $Co_{35}Tb_{65}$, and those for information recording by the surface electron state include a thin film of amorphous silicon, organic compounds with a $\pi$-electron system and chalcogenide compounds.

As explained in the foregoing, the information processing apparatus of the present invention can prevent the contact between the probe electrode and the recording medium, since, upon detection of an edge on the recording medium, the probe electrode is shifted to a holding state, thereby being prevented from entering a tracking groove or the like formed on the recording medium. Consequently, the scanning speed can be increased, thus achieving faster probe movement between the tracks and faster data access.

What is claimed is:

1. An information recording/reproducing apparatus for effecting at least one recording and reproduction of information with a probe on a recording medium provided with plural parallel tracks used as reference comprising:

a probe electrode;

means for applying a voltage between said probe electrode and said recording medium;

means for detecting a current flowing to said probe electrode upon said voltage application;

means for controlling a distance between said probe electrode and said recording medium such that the current value detected becomes constant:

means for moving said probe electrode in a direction crossing said tracks for access to a desired track;

means for detecting an edge portion of each of said tracks from a change in the detected current; and means for holding the distance control provided by said distance controlling means when said edge portion is detected.

2. An apparatus according to claim 1, wherein said holding by said holding means is adapted to fix the probe electrode at a distance from the recording medium, further apparatus than a distance between said probe electrode and said recording medium upon the edge portion detection by said edge detection means.

3. An information recording/reproducing method of effecting at least one of recording and reproduction of information with a probe electrode on a recording medium provided with plural tracks used as reference, said method comprising the steps of:

applying a voltage between said probe electrode and said recording medium;

detecting a current flowing to said probe electrode upon said voltage application;

controlling a distance between said probe electrode and said recording medium such that the current value detected becomes constant;

moving said probe electrode in a direction crossing said tracks for access to a desired track;

detecting an edge portion of each of said tracks from a change in the detected current; and holding the distance control made in said distance control step when said edge portion is detected.

* * * * *

UNITED STATES PATENT AND TRADEMARK OFFICE
CERTIFICATE OF CORRECTION

PATENT NO. : 5,299,184
DATED : March 29, 1994
INVENTOR(S) : AKIHIKO YAMANO ET AL.

It is certified that error appears in the above-identified patent and that said Letters Patent is hereby corrected as shown below:

In the Drawings:

<u>SHEET 4 OF 7</u>

FIG. 5, "SUMPLE" should read --SAMPLE--.

<u>SHEET 6 OF 7</u>

FIG. 7, "SUMPLE" should read --SAMPLE--.

<u>COLUMN 3</u>

Line 20, "means" should read --means.--.

<u>COLUMN 4</u>

Line 1, "which" should read --while--.
    Line 61, "An" should read --A--.

<u>COLUMN 5</u>

Line 28, "following" should read --following,--.

<u>COLUMN 7</u>

Line 5, "one" should read --one of--.

UNITED STATES PATENT AND TRADEMARK OFFICE
CERTIFICATE OF CORRECTION

PATENT NO. : 5,299,184
DATED : March 29, 1994
INVENTOR(S) : AKIHIKO YAMANO ET AL.     Page 2 of 2

It is certified that error appears in the above-identified patent and that said Letters Patent is hereby corrected as shown below:

<u>COLUMN 8</u>

Line 4, "apparatus" should read --apart--.

Signed and Sealed this

Thirteenth Day of December, 1994

Attest:

BRUCE LEHMAN

*Attesting Officer*     *Commissioner of Patents and Trademarks*